United States Patent
Thornberg

[11] 4,173,428
[45] Nov. 6, 1979

[54] PRINTER'S PAPER PILE INVERTER

[75] Inventor: John H. Thornberg, Minneapolis, Minn.

[73] Assignee: Bethany Fellowship, Inc., Minneapolis, Minn.

[21] Appl. No.: 846,884

[22] Filed: Oct. 31, 1977

[51] Int. Cl.$^2$ .............................................. B65G 7/02
[52] U.S. Cl. ................................ 414/766; 280/47.36; 294/103 R
[58] Field of Search .................... 214/1 Q, 1 QA, 301, 214/309; 280/47.36; 294/99 S, 103

[56] References Cited

U.S. PATENT DOCUMENTS

| | | | |
|---|---|---|---|
| 111,558 | 2/1871 | Morse | 280/47.36 |
| 1,261,065 | 4/1918 | Smend et al. | 294/99 S |
| 3,089,598 | 5/1963 | Temple | 214/1 Q |
| 3,670,903 | 6/1972 | Hamilton | 214/1 Q |
| 3,797,687 | 3/1974 | Silva | 294/103 R |
| 3,923,167 | 12/1975 | Blankenbeckler | 214/1 Q |

Primary Examiner—Joseph F. Peters, Jr.
Assistant Examiner—Ross Weaver
Attorney, Agent, or Firm—Burd, Braddock & Bartz

[57] ABSTRACT

A printer's paper pile inverter includes two parallel, spaced apart, C-frames held in spaced relationship to each other by a base frame including a plurality of C-frame connecting straps integral with, and extending between the base legs of each of the C-frames. First outwardly extending legs of the C-frames and a pallet lift fork mounted on the base frame are slid under a first pallet supporting a pile of papers to be inverted. A second pallet is inverted and placed on top of the paper pile. A jacking mechanism supported on the base frame of the inverter powers the lift fork to lift the first pallet until the second pallet comes into contact with the under surfaces of second outwardly extending legs of each C-frame. Two handlebars, slidably mounted in handlebar sleeves which are integral with the base legs of the C-frames, are used to tip the paper pile and inverter from an upright position, to a position such that the inverter and pile can be transported on provided transport wheels to any desired location for use of the pile after it is inverted; to tip the inverter to a reclining position supported parallel to the ground on these wheels and on provided support feet; and to tip the inverter to position it in an inverted position. The jacking mechanism is disabled or used to lift the pallet lift fork from the first pallet, the first pallet is removed, and the second pallet and inverted paper pile are removed from between the first and second outwardly extending C-frame legs of the pile inverter and moved to a location for use.

4 Claims, 8 Drawing Figures

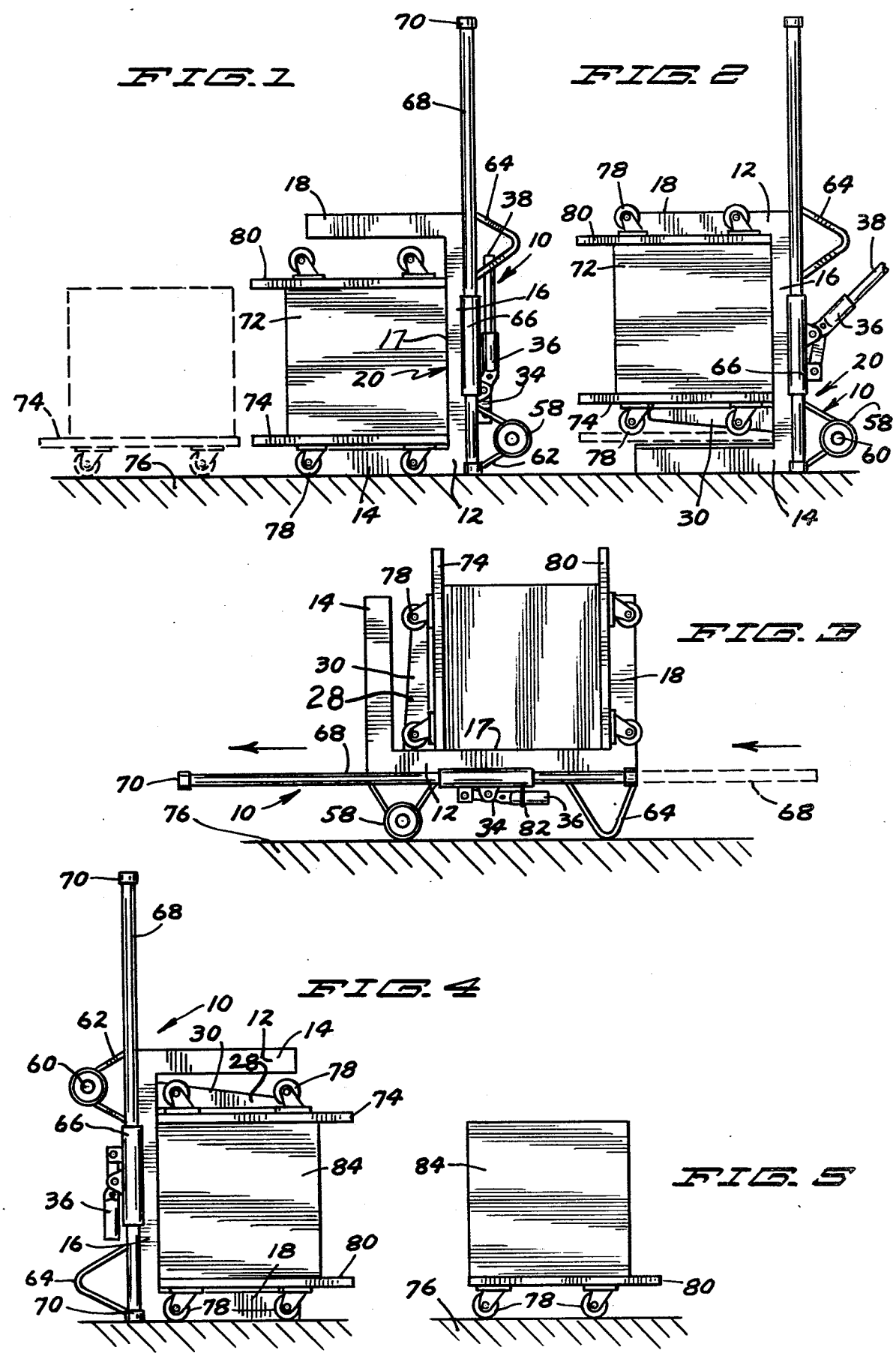

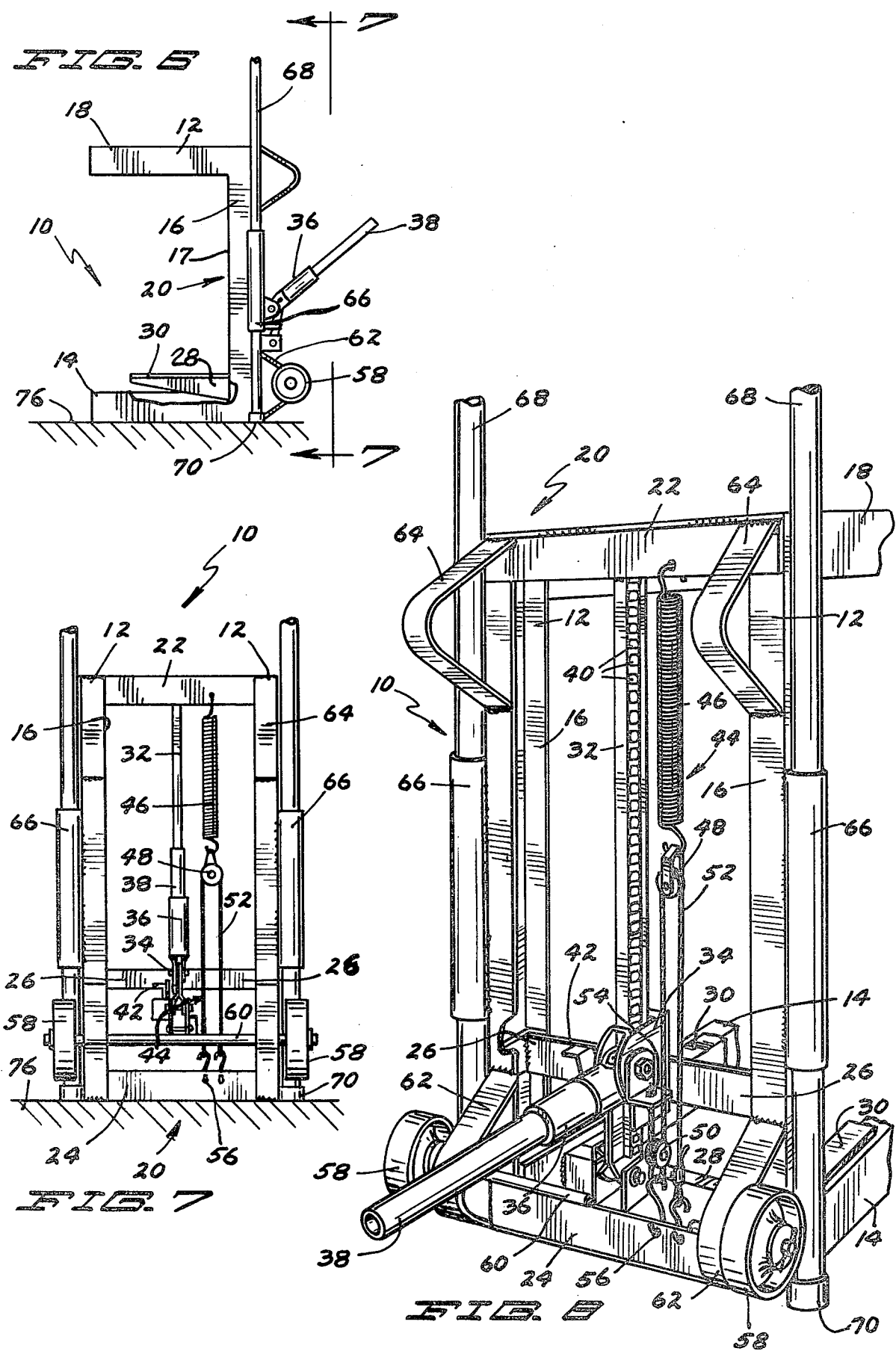

PRINTER'S PAPER PILE INVERTER

BACKGROUND OF THE INVENTION

This invention has relation to a device for inverting piles of paper supported on pallets. In the process of printing sheets of paper on both sides, the sheets, after being printed on a first side, come from the printing press and are deposited rapidly in vertical piles on pallets with the ink being initially somewhat wet. Slip sheets may or may not be used. Alignment of the papers must be maintained, slippage between individual sheets of paper minimized, and the pile of papers must be inverted so that the individual sheets can be fed into the same or a second printing press for printing on the other side.

Without mechanical aids, it is necessary that portions of the pile or stack be manually removed and inverted successively to form a second pile or stack. This is time consuming; there tends to be an undue amount of sliding of adjacent sheets with respect to each other causing ink smear; and the different portions of the stack are not likely to be accurately aligned.

Excessively large and extremely expensive mechanical means have been devised to move under a pallet, lift the pallet and the paper stack thereon, clamp an inverted pallet on top of the stack, invert the pallets and stack, and lower the inverted stack to the ground supported on the formerly upper pallet. See, for example, U.S. Pat. No. 2,520,252 granted to G. C. Mutchler, in August of 1950. While it is possible that such extremely expensive mechanisms can make economic sense in certain very large printing operations, it is evident that such a means for inverting paper piles is completely out of the reach financially of the operator of a small or medium-size print shop. Also, such elaborate structures lack the portability which is often necessary or at least extremely desirable, as when several paper piles are to be run on one side, and stored for an indefinite period, before the same press is to be utilized to run these same paper piles on the second side.

It is known to lift a paper pile and pallet with a fork lift truck or the like; to put an inverted pallet on the top of such lifted paper pile; to slide a C-shape frame mounted within a partial hoop under and over the two spaced-apart pallets and the paper pile; to clamp the inverted pallet down against the paper pile by using studs mounted in the upper outer arm of the C-frame; to remove the fork lift truck; to roll the hoop to invert the paper pile and the pallets; to use the lift truck to elevate the once inverted, now upright, pallet and the paper pile; to pull the C-frame/hoop arrangement away from the inverted pile and pallets; and to use the fork lift to lower the inverted pile and pallets to the ground. See U.S. Pat. No. 2,769,557 to N. T. Ohr, granted in November of 1956.

Obviously this elaborate mechanism of the Ohr patent is outside of the cost effective range of all small and medium-sized printing operations and of all but the largest of operators. Unless there is some other purpose for a lift truck, it is very inefficient to have one on hand only for this purpose. If the lift truck were to be used for something else, it would obviously often cause delays in inverting paper piles when needed. Furthermore, the floor space required in the print shop to rotate the hoop through 180° and then to turn it over to reposition the fork lift truck to approach the hoop and inverted pile from the opposite direction limits the usefulness of this device.

Another device for inverting paper piles is shown in U.S. Pat. No. 3,738,519 to J. D. Edwards, granted in June of 1973. In this device, head mounted arms are provided to extend under the bottom pallet and above an inverted top pallet sandwiching a pile of papers to be inverted, the arms are moved together with great force to insure that papers cannot fall out of the pile or become misaligned, and then the pile is inverted, not by being rotated back to lie on one edge, but by being rotated with respect to the horizontal axis of rotation of the head mounted on a vertical stanchion. The pile being unsupported except by the force exerted by the two sets of clamping arms toward each other when the pile is in its one-half rotation position.

This structure also is unduly complicated and expensive. Because it relies on compression of the papers in the pile for its holding action, it is completely unsatisfactory except in situations where the ink has become thoroughly dried. Thus, for all practical purposes, it is unuseable in a modern print shop where the time between printing of the pile on one side and the beginning of the printing of the pile on the second side must be kept to an absolute minimum for efficiency and economy of operation.

Apparatus to invert other goods employing upper and lower clamps which are rotated about horizontal axes passing through vertically supported rotating heads is known. See U.S. Pat. No. 3,895,922 granted to D. E. Pluntz in July of 1975 for inverting boxes.

Devices to slide under pallets which support heavy articles and then to rotate those articles through only 90° by utilizing one-quarter of a hoop is known. See U.S. Pat. No. 2,251,731 to E. G. Daniels, granted in August of 1941 for rotating upright tobacco hogs heads weighing one thousand pounds (453.6 kg) to positions on their sides.

A preliminary patent search was conducted on this invention, and the only patents cited are the five set out above.

Applicant and those in privity with applicant know of no closer prior art than that discussed above.

BRIEF DESCRIPTION OF INVENTION

An inverter frame includes two parallel, spaced apart C-frames, each consisting of a base C-frame leg, a first C-frame leg extending outwardly from the base leg at right angles thereto at a first end thereof and a second C-frame leg extending outwardly in parallel relationship to the first C-frame leg at a second end of the base leg.

The inverter frame also includes a plurality of C-frame connecting straps integral with and connecting the base C-frame legs of the two C-frames. The connecting straps and base C-frame legs form part of a base frame.

A pallet lift fork or other platform is slidably supported with respect to the base frames and is initially positioned to lie over and between the two parallel first C-frame legs in the form shown; and a jack mechanism is supported with respect to the base frame in position to forceably elevate the pallet lift platform when the inverter is in an initial upright position.

Transport wheels are provided in spaced relation to the base frame adjacent the first end of the base C-frame legs. Support feed are provided adjacent the second end of the base C-frame leg and extend in spaced relation to the base frame.

Handlebars are movably positioned with respect to the base frame of the pile inverter to have a first position extending upwardly from this frame when pile inverter is in an upright position with first C-frame legs resting on a floor; and to have a second position in outwardly extending relationship with respect to the base frame and adjacent the second pair of C-frame legs when the pile inverter is in its inverted position with the second C-frame legs resting on the floor. When the pile inverter is in its reclining position with the base C-frame legs parallel to the floor, the handlebars can be moved between their first and second positions.

In operation, the first C-frame legs of each C-frame and the pallet lift platform or fork are positioned under a first pallet on which is situated a paper pile to be inverted. A second pallet is inverted and placed on top of the paper pile. The pallet lift platform is forceably moved in direction toward the second C-frame legs until the pile of paper and the two pallets are loosely clamped between the pallet lift platform and the second C-frame legs. The handlebars are then used to move the pile inverter from its upright position into a reclining position where the base frame is parallel with the floor and is supported on the transport wheels and the support feet.

The top surfaces of the base C-frame legs in this position lie in a single horizontal plane. Because the pallets and the paper pile are only loosely clamped, supporting the paper pile on this plane surface of the base C-frame legs will tend to square up the pile, without any substantial force being exerted between the individual sheets of the pile so that there will be no tendency to smear ink not yet dry.

The handlebars will be moved from their first to their second position, and these handlebars will then be used to elevate the pile inverter to an inverted position. The loose clamping force being exerted by the pallet lift fork will be relieved, the first, now inverted, pallet will be removed from the top of the pile, the second pallet and the paper pile will be removed from the pile inverter, and the sheets of the pile will be ready to be fed into a printing press to be printed on the second side.

IN THE DRAWINGS

FIG. 1 is a side elevational view of the printer's paper pile inverter of the present invention in upright position and shown in relationship to a first pallet supporting a pile of papers to be inverted and a second pallet which has been inverted and placed on top of the paper pile, just prior to operation of the pile inverter;

FIG. 2 is also a side elevational view of the structures of FIG. 1, but illustrating the relative positions of the paper pile, pallets and pile inverter after a pallet lift fork of the inverter has been used to loosely clamp the paper pile between the two pallets;

FIG. 3 is a side elevational view of the structures positioned as seen in FIG. 2, but with the pile, pallets and pile inverter having been moved by handlebars to a reclining position;

FIG. 4 is a side elevational view of the structures as positioned in FIGS. 2 and 3, but after the pile inverter has been elevated to an inverted position by the use of the handlebars;

FIG. 5 is a view of an inverted paper pile and pallet in a final position separated from the pile inverter of the invention and in condition so that sheets of the inverted pile can be fed into a printing press to be printed on a second side;

FIG. 6 is a side elevational view of a pile inverter positioned substantially as seen in FIG. 2 but with pallets and pile removed therefrom;

FIG. 7 is an end elevational view taken on the line 7—7 in FIG. 6; and

FIG. 8 is an enlarged, fragmentary, perspective view of the pile inverter of the invention without the paper pile and pallets but as seen from the right rear corner of the pile inverter as seen in FIG. 1.

DESCRIPTION OF PREFERRED EMBODIMENT

A printer's paper pile inverter 10 includes a pair of parallel, spaced apart C-frames 12,12 each such C-frame being made up of a first outwardly extending C-frame leg 14; a base C-frame leg 16; and a second, outwardly extending C-frame leg 18. Each of the outwardly extending first and second C-frame legs being integral with its base leg at an opposite end thereof and extending outwardly therefrom at a 90° angle. The interior surface 17 of the base C-frame legs 16,16 together define a single plane.

The paper pile inverter 10 includes a base frame 20 which is made up of the base C-frame legs 16,16, a first transversely extending C-frame connecting strap 22 integrally connected at outer ends thereof to each of the base legs 16,16; and a second transversely extending C-frame connecting strap 24 integral with the base C-frame legs 16,16 at opposite ends of these legs from first connecting strap 22.

Base legs 16,16 are constituted as channel irons open toward each other. A pallet lift fork support slide 26 is supported inside of the channels which constitute the base C-frame legs 16,16 for vertical movement with respect thereto as seen in FIGS. 1, 2, 4, 6, 7 and 8. A pallet lift platform or fork 28 is integrally mounted with the support slide 26 and includes two pallet lift fork tines 30,30 constituted as angle irons and each, when the parts are in an initial or lower position as seen in FIGS. 1 and 8, designed to overlie the first outwardly extending C-frame legs 14,14, as best seen in FIG. 8.

A jack post 32 is integral with and extends vertically from first transversely extending C-frame connecting strap 22 and second transversely extending C-frame connecting strap 24 when the inverter is positioned as in FIG. 8, for example, to lie in parallel relationship equidistant from the base C-frame legs 16,16. A jacking mechanism 34 can be of any usual or preferred construction and is integral with the pallet lift fork support slide 26 and the pallet lift platform or fork 28, integrally connecting these two elements to each other in the form of the invention as shown. The jacking mechanism includes a jack operator 36, designed to be pivoted on a horizontal axis through the use of a removable jack handle 38 to cause the jacking mechanism, pallet lift fork support slide 26, pallet lift fork 28 and tines 30,30 to be moved vertically with respect to the jack post 32 through the instrumentality of openings 40 provided in that jack post.

A mechanical jack direction switch 42 also forms a part of the jacking mechanism 34. When the mechanical switch is in an upwardly extended position as seen in FIG. 8, for example, the jacking mechanism will move up the jack post 32 upon operation of jack operator 36 and removable jack handle 38 in a vertical plane; while movement of the direction switch 42 to a downwardly extended position (not shown) will cause the jacking mechanism to move down the jack post as that direction is determined in FIGS. 1, 2, 6, 7 and 8. This would be the same as moving in the upward direction as seen in FIG. 4.

When there is no load on pallet lift fork 28 and consequently on the jacking mechanism 34, with the mechanical jack direction switch 42 in the "down" position, the jacking mechanism and the pallet lift fork 28 can be lifted or moved freely in the and "downward" direction above referred to. In other words, tines 30,30 and pallet lift fork 28 can be lifted in upward direction as seen in FIG. 4 with the direction switch in that position.

In order to balance and support the weight of the pallet lift fork support slide 26, jacking mechanism 34, and the pallet lift fork 28 including the pallet lift fork tines 30,30 in spaced relation to the paper pile after it has been inverted when the parts are positioned as seen in FIG. 4, a lift fork counterweight mechanism 44 is provided as seen in FIGS. 7 and 8. This mechanism includes a lift fork counterweight spring 46, fastened at one end to the first C-frame connecting strap 22, and supporting a first counterweight pulley 48 at the other end thereof. A second counterweight pulley 50 is supported from second C-frame connecting strap 24. A counterweight cable 52 is attached as at 54 to jacking mechanism 34, and extends around second counterweight pulley 50, first counterweight pulley 52, and is dead-ended to second transversely extending C-frame connecting strap 24 as at 56.

A pair of transport wheels 58,58 are mounted on an axle 60 to be freely rotatable with respect to wheel support straps 62,62 which are integral with and extend outwardly from a first end of each of the base C-frame legs 16,16 adjacent first C-frame legs 14. At a second end of these base C-frame legs 16,16, adjacent second C-frame legs 18,18, a pair of support straps are integral with the legs 16,16, and extend outwardly therefrom to form base frame support feet 64,64. As best seen in FIG. 3, wheel support straps 62 and transport wheels 58 on one end and support feet 64 on the other end of the base frame 20 are such as to support the interior, now upper, plane surfaces of each of the base C-frame legs 16,16 in substantially horizontal position with respect to the floor when the pile inverter is in its reclining position.

Hollow, cylindrical handlebar support sleeves 66,66 are fixed to centrally located outer edge portions of each of the base legs 16,16 as by welding. Handlebars 68,68 are slidably mounted in these support sleeves, and are provided with retaining caps 70,70 at each end thereof to insure that the handlebars do not unintentionally become removed from the support sleeves.

OPERATION

A printer's paper pile 72 which has been printed on one side is illustrated in FIGS. 1 and 2 as being supported on a first pallet 74. The pallet is shown as being held in spaced relationship with respect to a floor 76 by caster wheels 78; but it is to be understood that the two caster wheels seen in FIGS. 1 and 2 could be replaced by a transversely extending bolster and the other two caster wheels, out of sight behind the first two, could be replaced by a similar bolster.

In FIG. 1, the printer's paper pile 72 and the first pallet 74 are shown in dotted lines as they come from the printing press after one side of the papers in the printer's pile have been printed. From that position, the paper pile and first pallet is moved relatively to the printer's paper pile inverter 10, or the pile inverter is moved relative to the paper pile and pallet, until one edge of each of the sheets of paper is in aligned contact with the adjacent plane surface 17 of each of the base C-frame legs 16,16 as seen in full lines in FIG. 1. A second pallet 80 is then inverted and placed on top of the paper pile 72 as seen in that figure.

With the mechanical jack direction switch 42 positioned as seen in FIG. 8, the jack handle 38 is used to pivot the jack operator 36 in such a manner as to cause the jacking mechanism and the pallet lift fork 28 including pallet lift fork tines 30,30 to move upwardly, carrying the first pallet 74, the paper pile 72, and the second pallet 80 in upward direction until the second pallet comes in contact with the adjacent surface of second, outwardly extending C-frame legs 18,18 of each of the parallel C-frames 12,12. In reaching this position, the first pallet 74 has passed through a position shown for it in dotted lines in FIG. 2. With the parts positioned as seen in full lines in FIG. 2, the jack handle can be removed, and the jack operator 36 can be tied or fastened with an appropriate clip 82 to have parallel fixed relationship with respect to the jack post 32. See the clip 82 in FIG. 3.

From the position as seen in FIG. 2, the operator uses the handlebars 68,68 to rock the pile inverter 10, the paper pile 72, and the first and second pallets back to be balanced on the transport wheels 58, in which condition the paper pile can be transported to near its position for use when it reaches its inverted condition. The pile inverter is then laid down into the reclining position as seen in FIG. 3.

In applying the jacking force as explained in connection with FIG. 2, only sufficient force is applied to loosely clamp the paper pile 72 between the first and second pallets, so that each sheet of paper is supported laterally between the pallets very loosely, and is, upon vibration or other gentle movement of the pile inverter in reclining position, brought precisely into an edge contacting relationship with the adjacent plane surface 17 of each of the base C-frame legs 16,16, thus insuring that the entire paper pile is in perfect alignment.

While the pile inverter 10 is in its reclining position as seen in FIG. 3, the handlebars 68,68 will be slid from the position as seen in FIGS. 1, 2, 6, 7 and 8 and is seen in dotted lines in FIG. 3 to the position as seen in full lines in FIGS. 3 and 4.

Again using the handlebars 68,68, the operator will pivot the load inverter about base frame support feet 64,64, to bring the pile inverter, the inverted paper pile, now designated 84, first pallet 74, and second pallet 80 to the position as seen in FIG. 4.

At this point, the mechanical jack direction switch 42 is moved to its "down" position, and the pallet lift fork 28 including lift fork tines 30,30 is mechanically or manually raised up (this direction was "down"). The lift fork counterweight mechanism 44 counterbalances the weight of the lift fork, the jacking mechanism 34, and the lift fork support slide 26 so that the tines 30,30 stay in spaced relationship above first pallet 74 so that this first pallet may be removed from the top of the inverted paper pile 84, and the inverted paper pile 84 and second pallet 80 may be moved to a position for second printing, as illustrated in FIG. 5.

First pallet 74 can now be positioned to receive a new set of sheets coming from a printing press as they are printed on their first side. Empty pile inverter 10 can be lowered to its reclining position, the handlebars 68,68 slid to an opposite end of the pile inverter, and the inverter set back up in position as seen in FIG. 8 to be ready to invert another paper pile.

The jack mechanism is, of course, merely exemplary. Any other mechanical jack or hydraulic jack could be employed within the spirit of the invention. Ratchet means could be utilized to hold the lift fork and its tines in spaced relationship to the first pallet 74 on the paper pile during removal of the first pallet from the top of the pile, or the lift fork could be hand held and/or fastened in such spaced relationship during the time that the pile inverter and the paper pile on the second pallet are being disassociated from each other.

Any other changes are possible within the spirit of the invention and the scope of the claims which follow.

The embodiments of the invention in which an exclusive property or privilege is claimed are defined as follows:

1. A pile inverter for inverting a pile of papers initially positioned on a first pallet supported in spaced relation above a horizontal floor to be finally positioned on a second pallet supported in spaced relation above a floor;

said pile inverter including:
   A. a pair of parallel, spaced apart C-frames, each C-frame including:
      (1) a first outwardly extending C-frame leg;
      (2) a base C-frame leg connected to the first leg and extending at right angles thereto, said base leg being provided with a plane interior surface; and
      (3) a second outwardly extending C-frame leg connected to the base leg and extending at right angles thereto to lie in spaced, parallel, aligned relation to the first C-frame leg;
   B. a base frame including said base C-frame legs and members extending between said base legs to fixedly support these base legs to have fixed, parallel, spaced apart relation to each other;
   C. handle means supported on the base frame adapted to be useful to manually move said pile inverter successively from:
      (1) an upright position wherein said first C-frame legs are in contact with a horizontal floor, to
      (2) a reclining position wherein said base C-frame legs and said base frame are supported in parallel relation to said floor, and to
      (3) an inverted position wherein said second C-frame legs are in contact with said floor;
   D. a pallet lift platform supported with respect to said base frame;
   E. guide means for supporting said lift platform for movement in direction longitudinally of said base C-frame legs from a first position substantially aligned with a plane defined by the interior surfaces of said first outwardly extending C-frame legs toward a second position in parallel alignment with the first plane but adjacent interior surfaces of said second outwardly extending C-frame legs, said guide means being part of said base frame;
   F. jack means supported by said base frame adapted to move said platform from said first toward said second position when the pile inverter is in said upright position and when a pile of papers to be inverted is positioned on a first pallet, the first pallet is positioned over the lift platform, and an inverted second pallet is positioned on top of said paper pile in alignment with and below said second C-frame legs;
   G. foot means extending outwardly from said base frame to support said base frame in spaced relation to said floor when said pile inverter is in its reclining position;
   H. said handle means being constituted as a pair of handlebars, each positionable alternatively to extend outwardly from and in longitudinal alignment with said base C-frame legs in a first position beyond a first end of said base legs adjacent said first C-frame legs and in a second position beyond a second end of said base legs adjacent said second C-frame legs;
   I. said foot means including rotatably mounted transport wheels adjacent to said first end of said base C-frame legs;
   J. said foot means also including support feet adjacent to said second end of said base legs; and
   K. said transport wheels and said support feet being positioned to provide pivot points on the floor when the inverter is moved between said upright position and said reclining position and between said reclining position and said inverted position, respectively.

2. The paper pile inverter of claim 1 wherein:
   L. said handlebars are each slidable with respect to one of said base C-frame legs between said first and second handlebar positions; and
   M. a pair of longitudinally extending handlebar sleeves are integrally connected to said base frame in location to encompass, support and guide said handlebars when in use and when moving between said first and second handlebar positions.

3. A pile inverter for inverting a pile of papers initially positioned on a first pallet supported in spaced relation above a horizontal floor to be finally positioned on a second pallet supported in spaced relation above a floor;

said pile inverter including:
   A. a pair of parallel, spaced apart C-frames, each C-frame including:
      (1) a first outwardly extending C-frame leg;
      (2) a base C-frame leg connected to the first leg and extending at right angles thereto, said base leg being provided with a plane interior surface; and
      (3) a second outwardly extending C-frame leg connected to the base leg and extending at right angles thereto to lie in spaced, parallel, aligned relation to the first C-frame leg;
   B. a base frame including said base C-frame legs and members extending between said base legs to fixedly support these base legs to have fixed, parallel, spaced apart relation to each other;
   C. handle means supported on the base frame adapted to be useful to manually move said pile inverter successively from:
      (1) an upright position wherein said first C-frame legs are in contact with a horizontal floor, to
      (2) a reclining position wherein said base C-frame legs and said base frame are supported in parallel relation to said floor, and to
      (3) an inverted position wherein said second C-frame legs are in contact with said floor;
   D. a pallet lift platform supported with respect to said base frame;
   E. guide means for supporting said lift platform for movement in direction longitudinally of said base C-frame legs from a first position substantially aligned with a plane defined by the interior surfaces of said first outwardly extending C-frame legs toward a second position in parallel alignment with the first plane but adjacent interior surfaces of said second outwardly extending C-frame legs, said guide means being part of said base frame;

F. jack means supported by said base frame adapted to move said platform from said first toward said second position when the pile inverter is in said upright position and when a pile of papers to be inverted is positioned on a first pallet, the first pallet is positioned over the lift platform, and an inverted second pallet is positioned on top of said paper pile in alignment with and below said second C-frame legs;

G. means supported on said base frame to permit said lift platform to be moved toward said first position when said inverter is in said inverted position;

H. means adapted to retain said lift platform in spaced relation to said first pallet and then inverted paper pile to allow said second pallet and paper pile to be separated from said pile inverter;

I. said means to permit said platform to be elevated including said jacking mechanism and a jack direction switch constituting part of said jacking mechanism;

J. said means adapted to retain said lift platform in spaced relation to said first platform including resilient means constantly urging said platform to move from said second position toward said first position;

K. foot means extending downwardly from said base frame to support said base frame in spaced relation to said floor when said pile inverter is in its reclining position;

L. said handle means being constituted as at least one handlebar positionable alternatively to extend outwardly in longitudinal alignment with said base C-frame legs beyond a first end of said base legs adjacent said first C-frame legs and beyond a second end of said base legs adjacent said second C-frame legs;

M. said foot means including first support foot means adjacent to said first end of said base C-frame legs;

N. said foot means also including second support foot means adjacent to said second end of said base legs; and O. said first and second support foot means being positioned adjacent said first and second ends of said base legs, respectively, to provide pivot points on the floor when the inverter is moved between said upright position and said reclining position and between said reclining position and said inverted position, respectively.

4. A pile inverter for inverting a pile of papers initially positioned on a first pallet supported in spaced relation above a horizontal floor to be finally positioned on a second pallet supported in spaced relation above a floor; said pile inverter including;

A. a pair of parallel, spaced-apart, rigid C-frames, each C-frame including:
  (1) a first outwardly extending C-frame leg;
  (2) a base C-frame leg connected to the first leg and extending at right angles thereto, said base leg being provided with a plane interior surface; and
  (3) a second outwardly extending C-frame leg connected to the base leg and extending at right angles thereto to lie in spaced, parallel, aligned relation to the first C-frame leg;

B. a base frame including said base C-frame legs and members extending between said base legs to fixedly support these base legs to have fixed, parallel, spaced-apart relation to each other;

C. handle means supported on the base frame adapted to be useful to manually move said pile inverter successively from:
  (1) an upright position wherein said first C-frame legs are in contact with a horizontal floor, to
  (2) a reclining position wherein said base C-frame legs and said base frame are supported in parallel relation to said floor, and to
  (3) an inverted position wherein said second C-frame legs are in contact with said floor;

D. a pallet lift platform supported with respect to said base frame;

E. guide means for supporting said lift platform for movement in direction longitudinally of said base C-frame legs from a first position substantially aligned with a plane defined by the interior surfaces of said first outwardly extending C-frame legs toward a second position in parallel alignment with the first plane but adjacent interior surfaces of said second outwardly extending C-frame legs, said guide means being part of said base frame;

F. jack means supported by said base frame adapted to move said platform from said first toward said second position when the pile inverter is in said upright position and when a pile of papers to be inverted is positioned on a first pallet, the first pallet is positioned over the lift platform, and an inverted second pallet is positioned on top of said paper pile in alignment with and below said second C-frame legs; and wheels rotatably supported with respect to said base frame at an end of said base frame adjacent said first outwardly extending C-frame legs, said wheels being in position to accept and support the pile inverter as the pile inverter moves from said upright position toward said reclining position.

* * * * *